US011709926B2

United States Patent
Huet et al.

(10) Patent No.: US 11,709,926 B2
(45) Date of Patent: Jul. 25, 2023

(54) METHOD AND DEVICE FOR AUTHENTICATING A USER

(71) Applicant: ORANGE, Issy-les-Moulineaux (FR)

(72) Inventors: Romain Huet, Chatillon (FR); Olivier Lepetit, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 277 days.

(21) Appl. No.: 17/043,193

(22) PCT Filed: Mar. 25, 2019

(86) PCT No.: PCT/FR2019/050672
§ 371 (c)(1),
(2) Date: Sep. 29, 2020

(87) PCT Pub. No.: WO2019/186041
PCT Pub. Date: Oct. 3, 2019

(65) Prior Publication Data
US 2021/0026945 A1    Jan. 28, 2021

(30) Foreign Application Priority Data

Mar. 30, 2018 (FR) ...................... 1852786

(51) Int. Cl.
*G06F 21/36* (2013.01)
*H04W 12/06* (2021.01)
(Continued)

(52) U.S. Cl.
CPC .............. *G06F 21/36* (2013.01); *G06N 3/08* (2013.01); *H04L 63/08* (2013.01); *H04L 63/123* (2013.01); *H04W 12/068* (2021.01)

(58) Field of Classification Search
CPC ....... G06F 21/36; H04L 63/08; H04L 63/123; H04W 12/068
See application file for complete search history.

(56) References Cited

U.S. PATENT DOCUMENTS 7,725,725 B1 * 5/2010 Odom ..................... G06F 21/31
713/176
10,635,801 B2 * 4/2020 Tovey ................. H04L 63/0853
(Continued)

FOREIGN PATENT DOCUMENTS

WO    2017093639 A1    6/2017

OTHER PUBLICATIONS

English translation of the Written Opinion of the International Searching Authority dated May 31, 2019 for corresponding International Application No. PCT/FR2019/050672, filed Mar. 25, 2019.
(Continued)

*Primary Examiner* — Chau Le
(74) *Attorney, Agent, or Firm* — David D. Brush; Westman, Champlin & Koehler, P.A.

(57) ABSTRACT

A method and a device for authenticating a user. A signal representative of at least one character traced by the user on a surface of a transmitter device is received by the authentication device. The transmitter device includes an antenna able to transmit a radio signal to a terminal of the user via a channel using the electromagnetic wave conduction capabilities of the body of the user when the hand of the user traces the at least one character on or close to the surface of the transmitter device. The authentication device checks whether the received signal corresponds to a previously stored control signal and, in the event of a positive check, confirms authentication of the user.

12 Claims, 5 Drawing Sheets

(51) Int. Cl.
  *G06N 3/08* (2023.01)
  *H04L 9/40* (2022.01)

(56) References Cited

U.S. PATENT DOCUMENTS

| | | | | |
|---|---|---|---|---|
| 2001/0056410 | A1* | 12/2001 | Ishigaki | G06Q 20/3674 |
| | | | | 705/67 |
| 2003/0179912 | A1 | 9/2003 | Murase et al. | |
| 2003/0233557 | A1* | 12/2003 | Zimmerman | G06V 40/30 |
| | | | | 713/170 |
| 2010/0321159 | A1* | 12/2010 | Stewart | G07C 9/257 |
| | | | | 340/5.83 |
| 2011/0154485 | A1 | 6/2011 | Hyun et al. | |
| 2013/0142363 | A1* | 6/2013 | Amento | H04R 25/554 |
| | | | | 381/151 |
| 2015/0128234 | A1 | 5/2015 | Xavier et al. | |
| 2015/0178489 | A1* | 6/2015 | Nakano | G06F 21/35 |
| | | | | 726/19 |
| 2015/0317851 | A1 | 11/2015 | Linnartz | |
| 2018/0351604 | A1 | 12/2018 | Levionnais et al. | |

OTHER PUBLICATIONS

International Search Report dated May 21, 2019 for corresponding International Application No. PCT/FR2019/050672, filed Mar. 25, 2019.

French Search Report and Written Opinion dated Oct. 5, 2018 for corresponding French Application No. 1852786, filed Mar. 30, 2018.

Sao Nakanisji et al., "Biometric Identity Verification Using Intra-Body Propagation Signal", Biometrics Symposium, 2007, IEEE, PI, Sep. 1, 2007 (Sep. 1, 2007), pp. 1-6, XP031202446.

European Notification under Article 94(3) EPC dated Aug. 1, 2022 for corresponding European Application No. 19 718 795.8.

Xuefeng Yin et al., "Personal Authentication using the Fingerprints of Intra-body Radio Propagation Channels", Medical Information and Communication Technology (ISMICT), 2013 7th International Symposium On, IEEE, Mar. 6, 2013 (Mar. 6, 2013), pp. 159-163, XP032415573.

English translation of M.BELAHCENE20 BENATIA Mebarka (Journal of Materials Science, LARHYSS Laboratory No. 02 (Revue science des materiaux, Laboratoire LARHYSS No. 02), Sep. 2014, pp. 01-08.

Khorshid et al., "Intra-Body Communication Model Based on Variable Biological Parameters", 49th Asilomar Conference on Signals, Systems and 35 Computers, IEEE, 2015.

M.BELAHCENE20 BENATIA Mebarka (Journal of Materials Science, LARHYSS Laboratory No. 02 (Revue science des materiaux, Laboratoire LARHYSS No. 02), Sep. 2014, pp. 01-08.

* cited by examiner

METHOD AND DEVICE FOR AUTHENTICATING A USER

CROSS-REFERENCE TO RELATED APPLICATIONS

This Application is a Section 371 National Stage Application of International Application No. PCT/FR2019/050672, filed Mar. 25, 2019, the content of which is incorporated herein by reference in its entirety, and published as WO 2019/186041 on Oct. 3, 2019, not in English.

1. FIELD OF THE INVENTION

The invention relates to the authentication of a user, via communications initiated over a short-range wireless channel. More specifically, the invention relates to a method for authenticating a user with an application or a device, via a portable terminal of the user able to establish a communication using the conductivity capability of the human body to transmit the electromagnetic waves carrying such wireless communications.

2. PRIOR ART

There are systems that allow a user to sign a receipt or a contract digitally, for example in the case of the delivery of a registered letter by the postal service. Such systems require a touch surface on which the user traces the characters, letters of their signature, or their initials by finger or using a stylus for example.

Such systems then record the series of letters traced by the user in the form of an image for example. However, such systems are generally not equipped to control the authenticity of the signature of the user and do not allow validation that it is the user who signed.

Writing recognition systems also exist which make it possible to determine whether a series of handwritten letters traced by a user corresponds to a series of handwritten letters previously stored. However, such systems are implemented a posteriori, i.e. once the signature to be verified has been stored and are based on complex image analysis algorithms. They also require an initial learning of the signature of the user, and that when verification is required, this learning be accessible to the device on which the user traces the signature to be verified. Such a mechanism is therefore not suitable for the case that the device on which the user traces the signature to be verified is used for the first time by the user, for example when signing a receipt.

In addition, such systems require a specific sensor, such as a touch surface, on which the user traces the characters. Such a method is therefore not suitable for all of the devices that a user might use during an action requiring authentication, for example signing an acknowledgment of receipt, initialing a legal document digitized by a notary, for example, authenticating with a terminal to access a secure place, making a secure payment, etc.

3. SUMMARY OF THE INVENTION

The invention improves on the prior art. To this end, it relates to a method for authenticating a user, implemented by a processor. Such a method comprising:
  receiving a signal representative of at least one character traced by the user on a surface of a transmitting device comprising an antenna capable of transmitting a radio signal to a terminal of the user via a channel using electromagnetic wave conduction capabilities of the body of the user when the hand of the user traces said at least one character on or near the surface of the transmitting device;
  verifying whether the signal received corresponds to a previously stored control signal;
  in the case of a positive verification, validating the authentication of the user.

Advantageously, when the user traces at least one character on the surface of the transmitting device, a radio carrier wave, or electromagnetic signal, is transmitted by the transmitting device through the body of the user to a terminal of the user, for example a mobile phone, suitable for receiving such a signal.

Such a signal is characteristic of the characters traced by the user. Specifically, when the user traces characters on the transmitting device, their one or more fingers move over the surface of the antenna of the transmitting device, which creates variations in the electromagnetic field picked up by the terminal of the user. The amplitude of the signal received by the terminal of the user is thus modified according to the characters traced by the user and the way in which the user traces these characters. The signal is thus representative of the writing of the user.

In addition, the shape of the signal generated and transmitted via the body of the user also depends on a number of characteristics specific to the bearer (body size, age, gender, tissue water content, etc.), as well as the receiver of the terminal (characteristics and position of the antenna, etc.). Analyzing such a signal (shape, power, etc.) therefore makes it possible to extract characteristics specific to the user and to the characters traced by the user and therefore to recognize them by comparing with a known similar signal.

The control signal may for example correspond to a signal representative of a series of characters traced by the user during an initialization phase, or to parameters resulting from learning a signal representative of a series of characters traced by the user during the initialization phase. Such a signal may thus be interpreted as a biometric signature of the user.

According to another variant, the control signal may correspond to a series of previously stored coded characters, for example characters coded according to the ASCII standard, or any other protocol that can be interpreted by a computer. According to this latter variant, signals representative, respectively, of characters traced by the user were learned during the initialization phase and data representative of this learning were stored, for example in the form of parameters resulting from the learning, such as weights in a neural network.

If another user appropriates the terminal, they do not have the same biometric characteristics, and the characters traced by this other user will generate a different signal. Specifically, even if the other user knew the characters to be traced to imitate a signature of the first user, this other user would additionally have to imitate the way in which the first user traces the characters. In addition, even if this other user knew the characters to be traced and imitated the way the first user traces the characters, this other user would be given away by their intrinsic component.

The method described above thus makes it possible to provide a more secure authentication of the user.

For the communication to be established on the CBB (Communication By Body in English) channel, the terminal must be close to the transmission channel, hence to the body of the user, for example a distance less than a few cm, which is reasonable for the case of the user carrying the terminal in a pocket. It should be noted that the skin of the user does not need to be in contact with the terminal for communication to be established; similarly, even the hand of the user is not necessarily in physical contact with the antenna of the transmitting device either.

According to one particular embodiment of the invention, the verification comprises obtaining at least one previously stored item of authentication data specific to the user.

According to one variant of this particular embodiment of the invention, the item of authentication data corresponds to the control signal itself. For example, during the learning phase, the control signal is generated for the user when same traces a series of characters on the transmitting device, for example their signature, their initials, a password, etc.

According to another variant of this particular embodiment of the invention, the item of authentication data corresponds to the learning signal or parameters resulting from the learning of signals representative, respectively, of the tracing by the user of several characters on the transmitting device, for example all or some of the letters of the alphabet, numbers, etc. According to this other variant, it is possible to have an item of authentication data specific to a user, while using a generic control signal, or one common to several users.

According to another particular embodiment of the invention, the authentication device uses an identifier of the user to select at least one item of authentication data specific to the user from a set of user authentication data. According to this other particular embodiment of the invention, the authentication device is able to authenticate several users for whom authentication data have previously been stored. For example, the identifier of the user corresponds to a telephone number of the user, or an access code stored in the memory of the terminal.

According to another particular embodiment of the invention, the verification further comprises recognizing each character traced by the user on the basis of the at least one item of authentication data obtained, delivering a series of recognized characters, and determining whether the series of recognized characters corresponds to the previously stored control signal. According to this particular embodiment of the invention, the control signal was previously recorded directly in digital form, for example as a password, or a code, etc. According to this particular embodiment of the invention, a learning phase was carried out in order to learn the tracing by the user of each character at least included in the control signal. This learning may be carried out independently for each character included in the control signal, or for more characters if the control signal is likely to be updated. Thus, the learning phase does not need to be carried out again.

According to another particular embodiment of the invention, the signal representative of at least one character traced by the user is received by an authentication device, from the terminal of the user. According to this particular embodiment of the invention, the authentication method is implemented by an authentication device separate from the terminal of the user.

In this case, a signal representative of the characters traced by the user is transmitted by the transmitting device via the CBB channel to the user terminal. This signal is then retransmitted by the terminal to an authentication device which validates or does not validate the authentication. For example, such a particular embodiment of the invention may be used to authenticate a user when controlling access to a secure place via an access point. As a variant, the authentication device and the transmitting device may be included in the same device.

According to another particular embodiment of the invention, the validation comprises sending an authentication validation signal to a control device. According to this particular embodiment of the invention, the control device may be the transmitting device or another device capable of controlling a service to which the user wishes to have access via their authentication. It may be, for example, an access point for access to a secure place, a bank server for authorizing a bank transaction, etc.

According to another particular embodiment of the invention, the verification is implemented by a neural network that has previously learned the at least one item of authentication data specific to the user. According to this particular embodiment of the invention, learning by the neural network is previously implemented in order to configure a neural network specific to the user.

According to one variant, such a neural network may also be specific to the stored control signal. In operation, when authentication of the user is required, the received signal is delivered as input to the neural network which provides, as output, a value representative of the correspondence between the received signal and the control signal, for example a probability value, or a Boolean value: for example 1 if authentication is successful and 0 if authentication fails.

According to another variant, the neural network has learned a group of characters traced by the user, for example the letters of the alphabet. In operation, when authentication of the user is required, the received signal is delivered as input to the neural network which provides, as output, the series of characters that the neural network has recognized from the received signal.

According to another particular embodiment of the invention, the verification provides a value of correspondence between the received signal and the control signal, the verification being positive when the correspondence value is higher than a determined threshold. According to this particular embodiment of the invention, the verification of the correspondence between the received signal and the control signal may be relaxed, i.e. the verification may be considered positive even if the two signals are not 100% identical. For example, the verification may be positive if the two signals correspond 95%.

A correspondence threshold between the received signal and the control signal may thus be defined according to the security level necessary for the application requiring authentication of the user.

The invention also relates to a device for authenticating a user, comprising at least one memory and processor which are configured for:
  receiving a signal representative of at least one character traced by the user on a surface of a transmitting device comprising an antenna capable of transmitting a radio signal to a terminal of the user via a channel using the electromagnetic wave conduction capabilities of the body of the user when the hand of the user traces said at least one character on or near the surface of the transmitting device;
  verifying whether the signal received corresponds to a previously stored control signal;
  validating the authentication of the user.

According to one particular embodiment of the invention, such a device further comprises a communication module for transmitting a validation signal to a control device.

The invention also relates to a terminal comprising an authentication device according to any one of the particular embodiments described above.

The invention also relates to a system for authenticating a user comprising at least one authentication device according to any one of the particular embodiments described above and said transmitting device or said terminal.

According to one particular embodiment of the invention, such a system further comprises a control device configured to receive a validation signal from the authentication device.

The invention also relates to a computer program comprising instructions for implementing the method described above according to any one of the particular embodiments described above, when said program is executed by a processor. The method may be implemented in various ways, in particular in wired form or in software form.

This program may use any programming language, and be in the form of source code, object code, or code intermediate between source code and object code, such as in a partially compiled form, or in any other desirable form.

The invention also relates to a computer-readable recording medium or information medium, comprising instructions for a computer program as mentioned above. The above-mentioned recording media may be any entity or device capable of storing the program. For example, the medium may include a storage device, such as a ROM, for example a CD ROM or a microelectronic circuit ROM, or a magnetic recording device, for example a floppy disk or a hard disk, a USB stick. Additionally, the recording media may correspond to a transmissible medium such as an electrical or optical signal, which may be routed via an electrical or optical cable, by radio or by other means. The programs according to the invention may in particular be downloaded from an Internet-type network.

Alternatively, the recording media may correspond to an integrated circuit in which the program is incorporated, the circuit being suitable for executing or for being used in the execution of the method in question.

4. LIST OF FIGURES

Other features and advantages of the invention will become more clearly apparent on reading the following description of particular embodiments, provided by way of simple illustrative and non-limiting examples, and the appended drawings, among which:

5. DESCRIPTION OF ONE EMBODIMENT OF THE INVENTION

5.1 General Principle of the Invention

The general principle of the invention is to use new wireless communication techniques using the human body as a channel to generate a signal representative of a series of characters traced by a user, for example alphanumeric characters, on a surface of a transmitting device and received by a user terminal. Using this generated signal and at least one item of authentication data previously learned for the user, it is possible to verify whether the signal received by the terminal is indeed representative of a previously stored control signal. It is thus possible to determine whether the user who has traced the characters is indeed the user of the terminal. The invention thus makes it possible, for example, to define a new type of biometric signature.

5.2 Particular Embodiments of the Invention

Over the past decades, new wireless communication techniques have appeared, using the human body as a channel. In these technologies, which are grouped under the generic term IBC (from the English: Intra-Body Communication) or BCC (for Body Channel Communication), the human body acts as a conductor to transmit information from one point to another. Of particular interest here are the methods based on induction coupling, also frequently called "near field methods" or NF (from the English Near Field), which are suitable for proximity communication. Near-field communications are usually known by the acronym "NFC" (for "Near-Field Communication"), based mainly on ISO (International Standard Organization) standard 14443, using wireless technologies to allow an exchange of information between two peripherals a short distance away from one another.

Figure 1A:
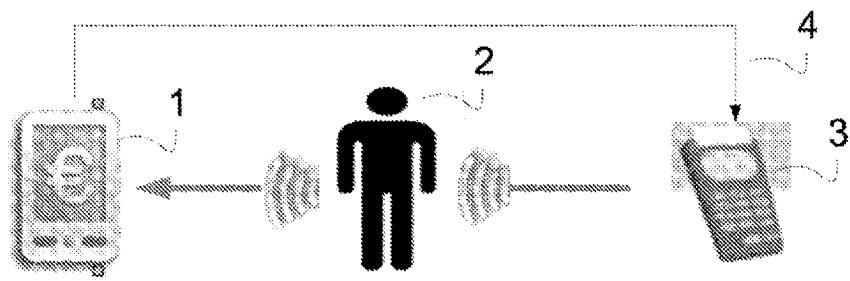
FIGS. 1A, 1B and 1C illustrate examples of an environment for implementing the invention according to particular embodiments of the invention.
Figure 1B:
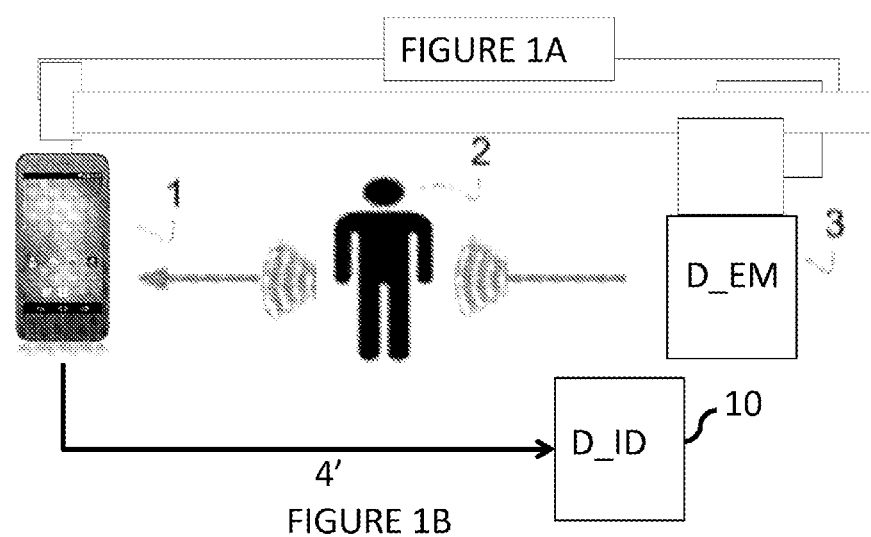
Figure 1C:
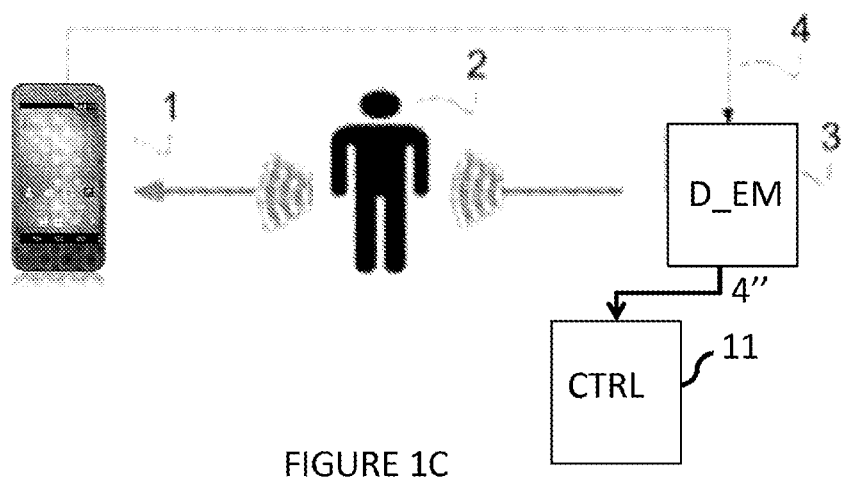

FIGS. 1A, 1B, and 1C show a wireless communication system according to different embodiments of the invention when a user (2) bearing a portable device (1), called terminal hereinafter, equipped with a CBB module as defined above, traces, using at least one finger, a series of characters, for example alphanumeric characters, on a surface of a transmitting device (3), to be authenticated with a device or service.

What is meant by service is any type of service, for example a monetary transaction, a ticket validation, access to a secure place, the signing or initialing of a digital document, etc.

The transmitting device (3) may for example be a connected object (in English, IOT for Internet of things), a TPE (electronic payment terminal), an access control point, a personal computer, a computer mouse, a home gateway, etc. It is able to transmit NFC-type radio signals, through the body of the user, via an NFC/CBB antenna (not shown). In this exemplary embodiment, the transmitting device (3) comprises a surface formed by the antenna, possibly protected and suitable for reacting when the user lightly touches it or comes into proximity with it, for example by bringing the hand closer. The term "surface" is in no way limiting and given by way of illustration, the antenna being the only elements essential for the operation of the device. The assembly formed of the antenna, the surface and more generally of all of the components required for the implementation of an IBC communication is hereinafter called "IBC transmitter module", denoted by MIBCM. It should be noted that this module corresponds to the standard NFC module of an NFC-type terminal configured for CBB communication by loading a specific (software) program, without modification of the hardware. The transmitting device according to this example (3) is a TPE comprising for example a user interface, also called IHM (human machine interface), for displaying messages for the attention of the user. According to the invention, such a user interface may possibly be able to receive data, but such a capability is not necessary for the implementation of the invention.

The terminal (1) according to the invention is a portable device that is naturally capable of receiving radio carrier waves, via an antenna, through the body of the user (2). To this end, the terminal (1) is located in the immediate vicinity of the user (2), without necessarily being in direct contact with them. For example, the terminal (1) is placed inside a pocket or a bag worn against the user. In these configurations, it is considered that the terminal (1) is not more than a few centimeters away from the body of the user (2). The distance is for example less than 5 cm. The terminal (1) is equipped with a battery or batteries, for autonomous operation. According to this example, it is a mobile terminal equipped with an NFC antenna (not shown) adapted for CBB mode in order to receive modulated electrical signals in the form of an electromagnetic wave through the body of the user when they are in the immediate vicinity of the transmitting device.

According to one preferred embodiment illustrated in FIG. 1A, the terminal (1) further comprises communication elements for communicating over a second channel (4), for example Bluetooth or Wi-Fi transmitter/receiver. The use of such a channel (4) allows higher bit rates and transmission speeds than CBB. This allows the terminal (1) of the user to communicate with the transmitting device (3), for example to transmit a validation signal when the authentication method described below is implemented by the terminal, or one or more signals representative of the characters traced by the user when the authentication method described below is implemented by the transmitting device.

According to another preferred embodiment illustrated in FIG. 1B, the terminal (1) further comprises communication elements for communicating over another channel (4'), for example Wi-Fi. This allows the terminal of the user to communicate with a control device (10), e.g. a bank server for authorizing a transaction. Such a channel (4') allows for example the terminal (1) to transmit a validation signal, for example via an IP data network and a Wi-Fi link, to the control device (10), when the authentication method described below is implemented by the terminal (1).

FIG. 1C illustrates one variant of the embodiment illustrated in FIG. 1A. According to this variant, the transmitting device (3) further comprises communication elements for communicating over another channel (4"), for example Bluetooth or Wi-Fi. This allows the transmitting device (3) to communicate with a control device (11), e.g. a secure door whose access is controlled by the transmitting device (3). Such a channel (4") allows for example the transmitting device (3) to transmit a validation signal to the control device (11), when the authentication method described below is implemented by the transmitting device (3).

According to a first scenario, the user (2) is for example in a store and wishes to pay for a purchase using a virtual bank card located on their terminal (1). The transmitting device (3) is able to establish, with the mobile terminal (1), a secure communication for the purpose of validating the monetary transaction; the user must be authenticated, i.e. at the end of the process it is certain that they are indeed the owner of the terminal.

According to another scenario, the user (2) wishes to access a secure place whose access is controlled by an access code or a signature. The transmitting device (3) is an access point placed near the secure door. The method makes it possible to determine whether the user is indeed a user authorized to access the secure place.

In both cases, the method according to the invention proceeds in two stages, or distinct phases:

First Phase: Learning at Least One Item of Data for Authenticating the User

In a first stage, which corresponds to what is called a learning phase, the user traces a character or a series of characters several times (in the following, N times, where N is a natural integer) on a surface of a reader associated with a learning module. It should be noted that for this step, the user is not necessarily in the store. The purpose of this step is to collect, preferably on the terminal (or alternatively, on another device with which the terminal is able to exchange data) a plurality (N) of signals which correspond to the signals generated by the person (2) when they trace the same character or the same sequence of characters the same number of times (N) on a surface of the reader.

These signals correspond to the characteristics of the user and the way in which they trace characters. These signals may exhibit small variations, since the user cannot always trace the same character or the same sequence of characters identically, i.e. with the same mechanical/dynamic parameters. Furthermore, their physiological parameters may also vary over time, causing a variation in the signal propagated through the body.

Therefore, according to one particular embodiment, the phase of learning the data for authenticating the user is implemented over several days. For example, the user traces the character or the series of characters to be learned one or more times on a first day, then once or more times on another day, etc.

The terminal of the user also has an effect on the shape of the received signal. Still, for a given person tracing a given character or a given series of characters, all of the signals are of very similar overall shape and represent a kind of biometric and behavioral signature of the user, which will be called hereinafter "authentication data" or "signature" of the user. The authentication data are therefore representative:

of characters traced by the user, for example letters of the alphabet, numbers, punctuation marks, etc., or of an ordered series of characters traced by the user: for example their initials, their name, an access code, a password, etc. Thus, each user may have their own authentication data.

When the authentication data have been learned for the user, they may then be used to verify whether a signal representative of a series of characters traced by the user actually corresponds to a control signal making it possible to authenticate the user.

In the case that the authentication data are representative of learning an ordered series of characters traced by the user, the control signal may correspond directly to the authentication data. In this case, the control signal is specific to the user since it includes characteristics intrinsic to the user.

The series of characters represented by the control signal may also be common to several users, but when it is traced by one user in particular, the series of characters is specific to the user since the series of characters traced comprises characteristics of the way in which the user draws the characters, their intrinsic characteristics; in addition to the behavioral biometric parameters which determine the transmission of the signal, certain biological factors, such as for example age, physical condition, motor control, water content of bodily tissues etc. of the user may influence its transmission characteristics. Reference may be made, for example, to the article "Intra-Body Communication Model Based on Variable Biological Parameters" (Khorshid et al., 2015, 49th Asilomar Conference on Signals, Systems and Computers).

characteristics of the terminal itself, and in particular of its CBB reception circuit (characteristics and orientation of the antenna, proximity to the body of the user, etc.).

In the case that the authentication data are representative of learning a set of characters traced separately by the user, without order, and learned independently, the control signal may correspond to a series of characters stored in a form that can be interpreted by a computer. In this case, the control signal may or may not be specific to the user, it may be a password common to several users, or the initials of the user, etc.

The authentication data (SIG) may be obtained by means of the N slightly different measurements entrusted to a learning module responsible for calculating an "average value" from the various signals, or standard signal corresponding to authentication data. This module is typically a machine learning module, "machine learning" (ML) in English. It is recalled that machine learning, or statistical learning, concerns the design, analysis, development and implementation of methods allowing a machine (in the broad sense) to evolve through a systematic process, and thus to perform difficult or problematic tasks using more conventional algorithmic means. One possible example of machine learning is that of classification, the aim of which is to tag each item of data by associating it with a class.

According to one preferred embodiment, neural networks are used here. According to this embodiment, conventionally, the learning module learns authentication data from the various signals of a user, i.e. it defines its parameters so that, from any received signal, it can then provide, as output, an indication of correspondence between the received signal and authentication data from the learning.

During the use phase, the neural network may also provide a membership class for the received signal. For example, in the case of learning to recognize an alphabet, with each symbol of the alphabet corresponding to a class, the neural network makes it possible to determine to which class, i.e. which symbol of the alphabet, the received signal corresponds. According to this example, in the case of a series of characters to be recognized, the neural network will successively process several received signals to recognize the various traced characters.

The learning module then records, in a database, the authentication data for users possibly identified by their identifiers. For example, the parameters determined by each neural network associated with a user are recorded.

Once learning has been carried out, the resulting authentication data or the parameters of the neural network corresponding to the authentication data may advantageously be recorded on the terminal of the user or the transmitting device. If the terminal or the transmitting device is used by several users, several items of authentication data or several sets of neural network parameters may be recorded, for example in conjunction with an identifier of each user.

Second Phase: Using the Authentication Data

In a second phase (of implementation of the service), the user of the IBC mobile terminal who wishes to validate a transaction approaches the transmitting device (3, for example a terminal) and traces a series of characters on a surface of the transmitting device or near the transmitting device. When the communication channel is established, the signal propagates from the terminal (3) to the mobile (1) of the user, through their body.

A verification module of the terminal or with which the terminal may communicate (for example on an external server) verifies the signal transmitted by the transmitting device. It is able, typically, to verify that the received signal does indeed correspond to a control signal, which was previously recorded on the terminal or in a database accessible from the terminal. As a variant, the verification module may be included in the transmitting device. In this case, the signal received by the terminal is retransmitted via another channel (4) to the transmitting device.

If the received signal corresponds to the control signal, the user is authenticated.

All of the data necessary for establishing, continuing and concluding the service may be exchanged between the terminal (or the transmitting device) and the transmitting device (or control device). For example, a Bluetooth or Wi-Fi channel (4, 4', 4") is established to exchange data, validate a ticket, open an access door, record a digital contract, etc.

It is recalled that the antenna integrated in the terminal is borne by the user. The invention therefore has a fundamental advantage in terms of ergonomics and security in that it allows the person wishing to access a secure service to be authenticated via a series of characters traced manually without having to take their terminal out of their pocket or their bag, and without using a keyboard to enter a confidential code which could be spied on.

This exemplary embodiment has been provided by way of illustration and is in no way limiting. Many variants could be envisaged. Notably:

another device, for example an external server, may perform the learning and/or recognition on receiving the data from the terminal or from the transmitting device.

it is possible to imagine modeling the human body as a characterizable transmission channel, i.e. it may be associated for example with a transfer function, well known to a person skilled in the art specialized in signal processing. In this case, the characteristics of the transfer function may advantageously replace the aforementioned curves. One example of such modeling is proposed for example in the article "Intra-Body Communication Model Based on Variable Biological Parameters" by Khorshid et al. cited above.

Figure 2:
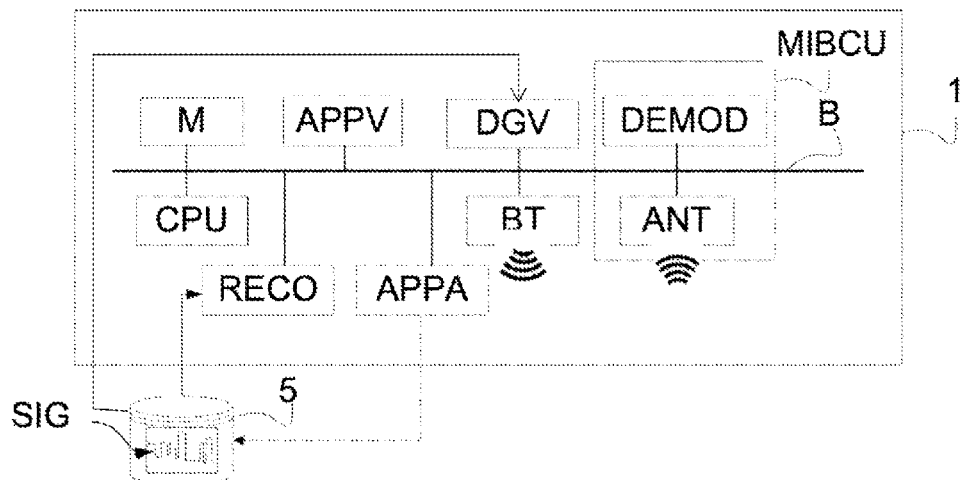
FIG. 2 shows a terminal according to one embodiment of the invention.

A terminal device (1) according to the invention will now be described with reference to FIG. 2. The terminal (1) is for example a mobile terminal of smartphone type suitable for implementing the invention. According to another example, the terminal is a simple circuit board equipped with the following modules:

a processing unit, or "CPU" (for "central processing unit"), for loading memory instructions, executing them, performing operations;

a set M of memories, including a volatile memory, or "RAM" (for "random access memory") used to execute code instructions, store variables, etc. and a non-volatile memory of "ROM" (from the English "Read Only Memory"), or "EEPROM" (for "Electronically Erasable Programmable Read Only Memory") type for containing persistent information, in particular user identification data, for example a mobile number, an identifier, etc. According to one embodiment of the invention, the memory M contains a memory zone (5), which is preferably secure, containing data for authenticating one user of the terminal at least.

a module called "User IBC module", MIBCU, including:
  a CBB antenna (ANT) suitable for receiving signals over the radio channel and via the human body, so that a modulated electrical signal transported by the body of the user is able to be received by the antenna, which is located in the terminal, close to the human body;
  a demodulator (DEMOD) for receiving, via the antenna, a modulated electrical signal and transforming it into a digital signal for transmission to the processing unit;
  the software components (firmware, etc.) required for implementing CBB communications;
a Bluetooth- or Wi-Fi-type radio module (BT) for transmitting, in particular, data back from the mobile to a transmitting device.
preferably, and in particular if these modules are not implemented on another device:
  a verification module DGV for analyzing a signal received by the CBB module and determining whether the received signal corresponds to a previously stored control signal;
  an application module APPV for validating or not validating the authentication of the user depending on whether the received signal corresponds to the control signal or not;
  according to one particular embodiment, a recognition module RECO capable of cooperating with the verification module DGV and configured to recognize a series of characters from a received signal and authentication data (SIG) for the user of the terminal,
preferably, and in particular if this module is not implemented on another device, an application (APPA) intended for the implementation of a learning process according to embodiments of the invention, in particular:
  learning at least one item of data for authenticating the user;
  accessing an authentication database (5) containing the data for authenticating one or more potential users of the terminal.

It should be noted that this learning module and this database are not necessarily located on the terminal: they may be on a server in a data network, on the transmitting device if centralized operation is desired, etc.

Figure 3:
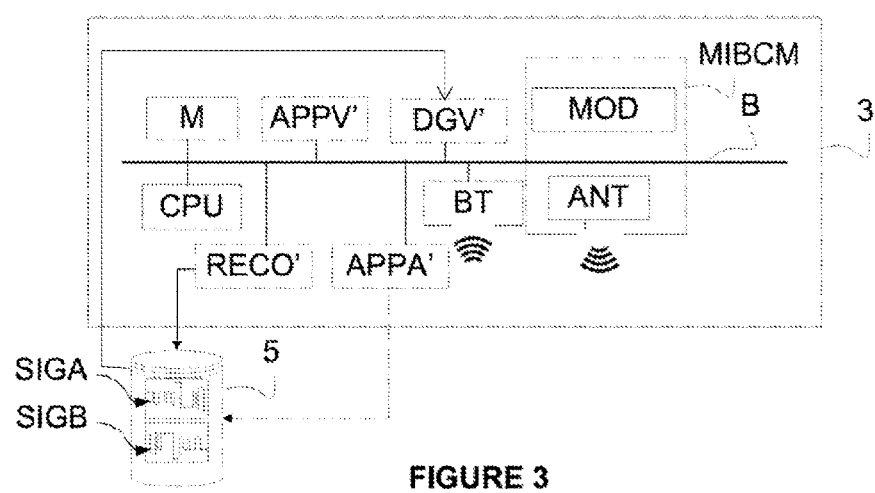
FIG. 3 shows a transmitting device according to one embodiment of the invention.

A transmitting device (3) according to the invention will now be described with reference to FIG. 3.

The transmitting device comprises several modules which are similar to those of the terminal 1 described with reference to FIG. 2:
  a processing unit, or "CPU" (for "Central Processing Unit"), for loading memory instructions, executing them, performing operations;
  a set M of memories, including a volatile memory, or "RAM" (for "Random Access Memory") used to execute code instructions, store variables, etc. and a non-volatile memory of "ROM" (from the English "Read Only Memory"), or "EEPROM" (for "Electronically Erasable Programmable Read Only Memory") type for containing persistent information;
  a module called "Transmitting IBC module", MIBCM, including:
    a CBB antenna (ANT) suitable for receiving signals over the radio channel and via the human body;
    a modulator (MOD) for adapting a digital signal produced by the microprocessor to give a modulated electrical signal for transmission, via the antenna, through the body of the user. The modulation operation carried out by the modulator is for example an amplitude modulation: the signal is an amplitude-modulated 13.56 MHz signal with a modulation factor of about 10% (type-B known characteristic according to the NFC standard). The invention is however not limited to this type of modulation. In another exemplary embodiment, the modulation is frequency modulation, less sensitive to interference, or phase modulation;
    a contact surface, not shown, suitable for reacting to the immediate proximity of the user (contact, near-contact, light touch, etc.). In the example described here, this surface corresponds to the antenna, so that a modulated electrical signal transmitted via the antenna is able to be carried by the body of the user who is in proximity to the surface. In one exemplary embodiment, the antenna may be integrated into the surface. The surface is arranged so as to cooperate with the processing unit in order to implement the steps of the method which will be described later on;
    a Bluetooth- or Wi-Fi-type radio module BT for, in particular, receiving data from the terminal of the user (signals received by the terminal, control signal, data relating to a transaction, etc.) and/or communicating with another device in order to validate a transaction (door, connected object, etc.).
    the software components (firmware, etc.) required for implementing IBC communications.
  Optionally, a user interface (IHM), not shown, suitable for transmitting instructions or information messages to the user. For example, the user interface is a screen on which messages and instructions are displayed. In another exemplary embodiment, the interface is an audio interface making it possible to play the messages and instructions, for example to indicate to the user whether they have been authenticated or if they have not been correctly authenticated. The IHM may also include a keyboard, a microphone, etc.
  optionally, and in particular if these modules are not present in the terminals:
    an application (APPA') for implementing a learning method according to one embodiment of the invention, in relation to an authentication database (5); a database including the authentication data of two users A and B denoted by SIGA and SIGB is shown schematically in the figure.
    a verification module DGV' for analyzing a signal received by the CBB module and determining whether the received signal corresponds to a previously stored control signal;
    according to one particular embodiment, a recognition module RECO' able to cooperate with the verification module DGV' and configured to recognize a series of characters from a received signal and authentication data for the user of the terminal;

an application module APPV' for implementing the authentication method according to some embodiments of the invention.

It is recalled that any commercial reader (for example a TPE) may advantageously be used as a transmitting device, provided that the MIBCM module is used, after a simple update to the software of the reader (installing and/or updating the application and configuring NFC transmission) to make it capable of transmitting a message having CBB characteristics (frequency, modulation, etc.) via its antenna.

Figure 4A:
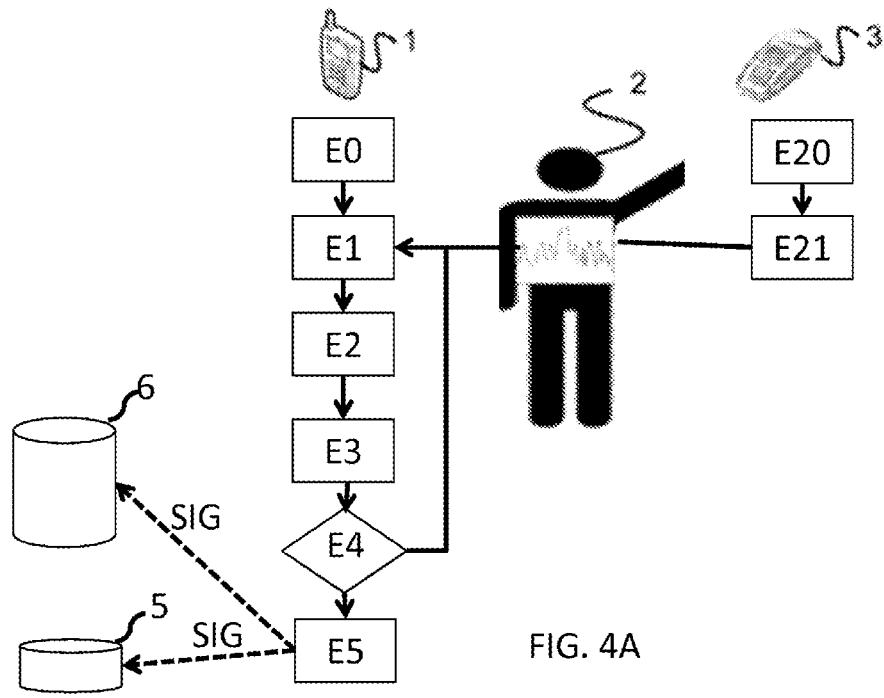
FIG. 4A shows steps of a method for learning at least one item of data for authenticating a user according to one embodiment of the invention.

FIG. 4A shows the steps of a learning method according to one embodiment of the invention.

Learning is carried out by repeatedly tracing a series of characters on a learning device, for example the transmitting device. The user is for example in a store of a telecommunications operator and prepares to trace a series of characters which will generate their authentication data. According to the particular embodiment described here, the authentication data also correspond to the control signal which will be used subsequently to verify the authentication of the user, when using CBB-type services.

According to this embodiment, the communication is unidirectional, from the learning device to the user terminal, and a Bluetooth communication channel (4) is used for communication from the terminal of the user to the learning device. The terminal of the user, for example of CBB smartphone type, is located in the pocket of the user.

It is assumed here that all of the prerequisites necessary for CBB communication have been carried out in the respective initialization steps E0 and E20, as for example described in application WO2017/093639, in particular the broadcasting, by the learning device, of a prompt message possibly including parameters relating to the service offered (service identifier, unknown, which will allow in particular Bluetooth pairing, etc.), putting the terminal in CBB reception mode, launching the learning program, etc.

In a step E21, the user traces a series of characters for the learning device (terminal, TPE, etc.). The series of characters comprises at least one character, for example an alphanumeric character. The series of characters may be decided by the user themself, or else supplied to the user, for example by the provider of the service requiring authentication of the user.

In a step E21, communication is established over the IBC channel. The terminal transmits the signal SP(t) which is transmitted via the body of the user and carries the characteristics of the series of characters traced by the user. Such a signal SP(t) is received by the terminal of the user (1) in a step E1.

In a step E2, the terminal of the user demodulates and processes the received signal SP(t).

In a step E3, the terminal stores the signal in a memory (shown here in the form of a database (6) by way of example). Alternatively, it may also transmit the signal to an external learning server. In step E3, the received signal Sp(t) is delivered as input to a neural network RES, the weights of which have previously been initialized to one or more default values.

In step E4, a number of iterations is tested and it is verified whether a number N of iterations of steps E1-E3 has been carried out; as long as the desired number of iterations has not been reached, the terminal of the user asks the user to retrace the series of characters (step E1), receives a new signal Sp(t) (step E1) that it delivers as input to the neural network RES so that it learns the data for authenticating the user corresponding to the series of characters traced by the user.

For example, the neural network may be used as described in the article "Authentication and Identification of Faces based on Wavelets and Neural Networks" ("Authentification et Identification de Visages basées sur les Ondelettes et les Réseaux de Neurones") by M. BELAHCENE-BENATIA Mébarka (Journal of Materials Science, LARHYSS Laboratory No. 02 (Revue science des matériaux, Laboratoire LARHYSS N° 02), September 2014, pp. 01-08). The method described, based on the transformation of a two-dimensional image of a face into a vector of size N obtained by linking up the rows (or columns) of the corresponding image, followed by establishing a covariance matrix between the different images, may be easily adapted for samples of the digital signals from the signals Sp(t).

The counter N is for example set to 3 and three signals $S_1(t)$, $S_2(t)$, $S_3(t)$ must be received and delivered to the neural network RES.

It should be noted that the number N of iterations may be predefined (for example N=10) or defined by the algorithm itself: for example, the number of iterations may depend on an output value of the neural network RES. For example, it is considered that the number of iterations has been reached when the coefficients of the neural network, i.e. parameters of the neural network, are near stable from one iteration to the next. In other words, it is considered that the number of iterations has been reached when the difference between the coefficients of the neural network between two iterations is less than 95% for example.

When the desired number of iterations has been reached or the output value is higher than the predetermined threshold, the learning of the neural network RES for the user is finished and the data for authenticating the user have been determined. For example, the authentication data are represented by the parameters of the neural network RES determined during the learning carried out in the iterations of steps E1-E2-E3.

In a step E5, the authentication data are stored in a memory, or database (5), either in the terminal of the user, or in an authentication data database, with preferably an identifier of the user (for example their name, date of birth, telephone number, MAC address of their terminal, bank account number, etc.).

According to another embodiment, not shown, it is the transmitting device (terminal) which learns the authentication data. In this case, step E1 of receiving the signal or E2 of demodulating and processing the signal by the terminal of the user may be followed by a step of retransmitting this signal to the transmitting device, via the Bluetooth channel.

The learning of the data for authenticating the user has been described above using a neural network. Other learning methods are of course possible, for example the N signals Sp(t) received in the iterations of steps E1-E2 may be stored and authentication data are determined from the N signals stored by means of any method within the competence of a person skilled in the art in order to obtain a signal representative of the N signals Sp(t), for example by taking an average, or by using an SVM (Support Vector Machine) system to classify the various signals received by putting them in the subset corresponding to signals from the user, etc.

The authentication data may typically take the form of an analog or digital signal, i.e. a function representing the variations of the signal corresponding to the average tracing of the series of characters by the user over a time period, for example a few seconds.

Figure 4B:
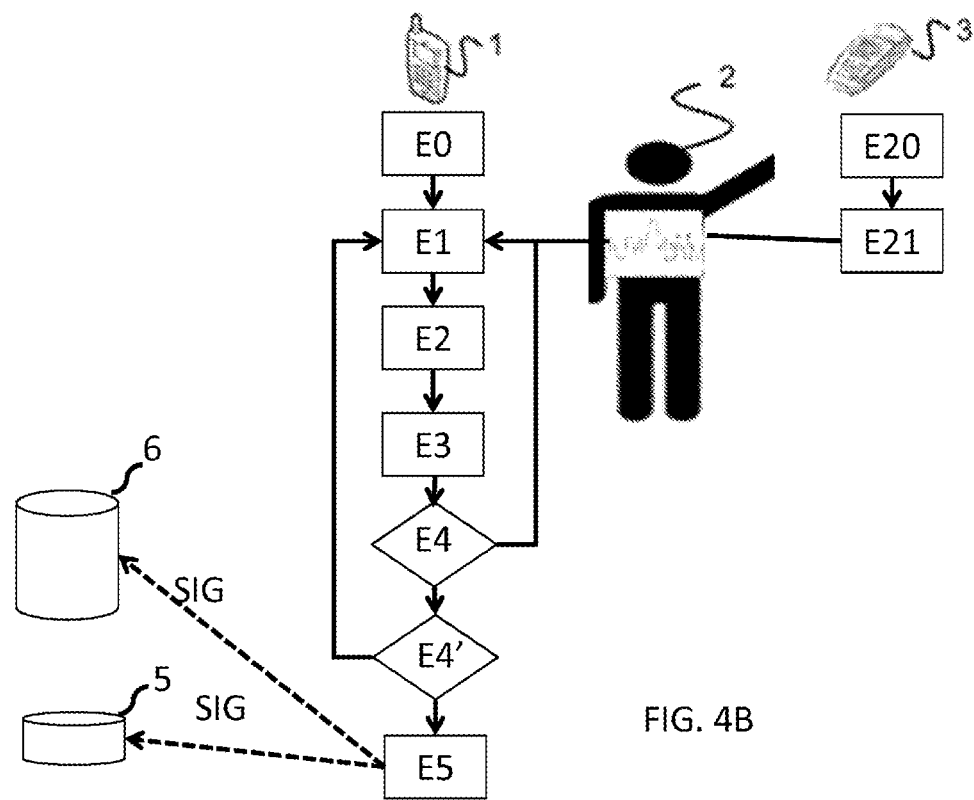
FIG. 4B shows steps of a method for learning at least one item of data for authenticating a user according to another embodiment of the invention.

A learning method according to another particular embodiment is described below with reference to FIG. 4B.

According to this particular embodiment of the invention, the authentication data make it possible to recognize a series of characters traced by the user during authentication, this series of characters then being compared with a control signal in order to validate or not to validate the authentication of the user.

According to the embodiment described here, the learning method allows the learning device to learn the tracing of each character independently, for example each letter of the alphabet is learned on its own and separately from the other letters.

According to this particular embodiment, the learning method learns to recognize letters or characters traced by the user from a group of predetermined characters. Such a group of characters may include all or some of the letters of the Latin alphabet, or of any other alphabet, numbers, ideograms, or any character capable of being represented in a form interpretable by a computer, for example by an ASCII code, to be stored in a memory.

In this particular embodiment, the iterations of steps E1-E3 are carried out successively for each character of the group of characters that the neural network RES must be able to recognize. The learning method illustrated in FIG. 4B is similar to that illustrated in FIG. 4A, except that in step E20, the user is prompted to trace a specific character so that the learning device knows which character is being learned. Optionally, the user may indicate themself via a keyboard of the learning device which character they will trace. The two variants presented here relate to supervised learning.

In addition, the learning method further comprises a step E4' which is carried out at the end of the learning of a character, when, following step E4, it is determined that the number of iterations for learning this character has been reached. In step E4', it is verified whether all of the characters of the group to be learned have been learned. If so, the method proceeds to step E5, otherwise the method proceeds to learning another character of the group.

In this embodiment, in step E5, the parameters of the neural network that are representative of the learning of letters traced by the user are stored as authentication data.

Figure 6:
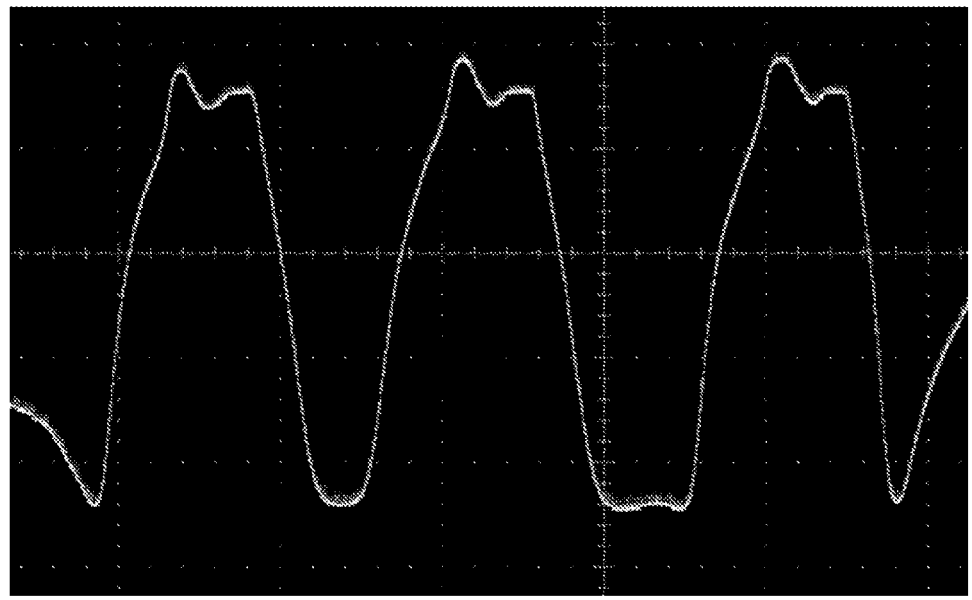
FIG. 6 shows an example of a signal representative of a character traced several times by a user on a surface of a transmitting device.

FIG. 6 shows an exemplary signal representative of a character traced several times by a user on a surface of a transmitting device, here the letter C.

Figure 5A:
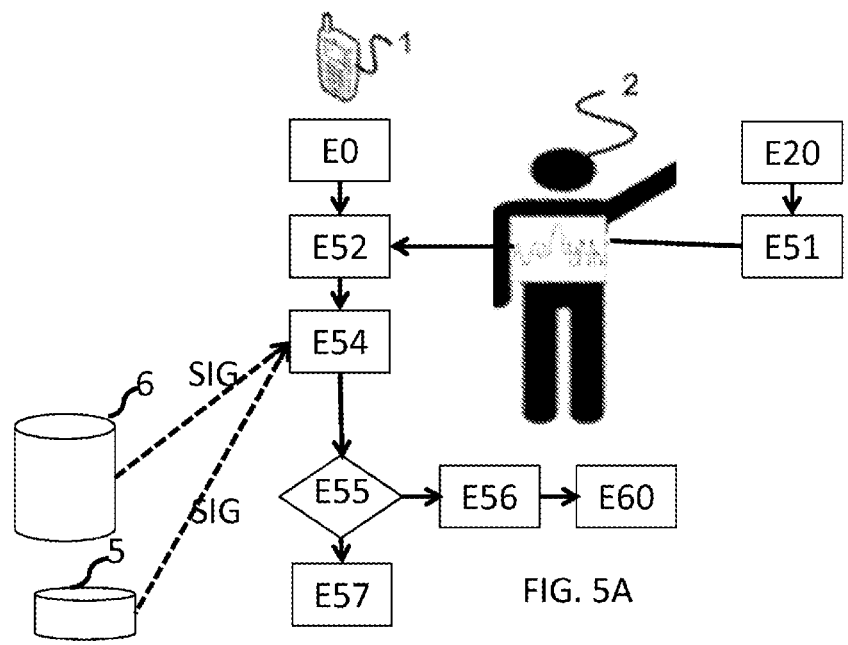
FIG. 5A shows the steps of an authentication method according to one embodiment of the invention.

FIG. 5A describes a method of authenticating a user according to one particular embodiment of the invention. According to this particular embodiment of the invention, the control signal to be verified corresponds to the data for authenticating the user which have been previously learned.

It is assumed here, as before, that all of the prerequisites necessary for CBB communication have been carried out in respective steps E0 and E20. It is also assumed that the learning phase described previously in support of FIG. 4A or of FIG. 4B has been carried out and that the data for authenticating the user are located on the mobile terminal (it is recalled that such data could be located elsewhere, in a database external to the terminal for example).

In a step E51, the user traces a series of characters on a surface of the transmitting device, near the antenna.

In step E51, communication is established over the CBB channel. The transmitting device transmits a signal which is modified by the tracing of the series of characters by the user. The modified signal that is transmitted via the body of the user and carries the characteristics of the series of characters traced by the test user is received by the terminal of the user (1) in a step E52. In step E52, the terminal of the user demodulates and processes the received signal.

Figure 7:
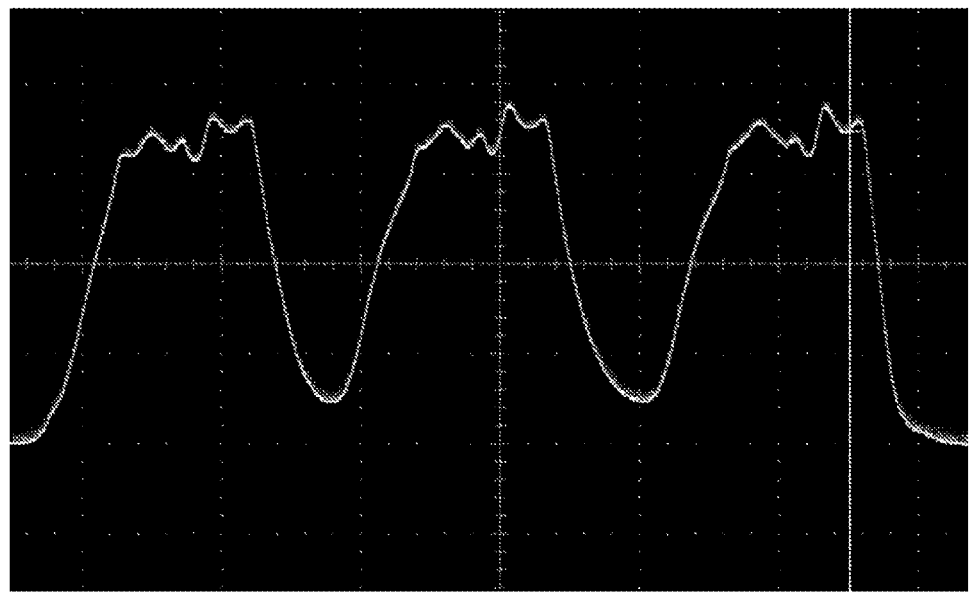
FIG. 7 shows an example of a signal representative of a series of characters traced by a user on a surface of a transmitting device.

FIG. 7 shows an exemplary received signal representative of a series of characters traced by a user on a surface of a transmitting device, here the initials of the user.

In a step E54, the terminal of the user obtains data for authenticating the user from its memory or from an external database, also corresponding, according to the particular embodiment described here, to the control signal to be verified. For example, it obtains the parameters of the neural network associated with the user.

In a step E55, it is verified whether the received signal corresponds to the control signal. For this, the received signal is delivered as input to the neural network which delivers, as output, a value representative of the correspondence between the received signal and the control signal or authentication data, for example a probability value. It is recalled that, according to this particular embodiment of the invention, in the learning phase, the neural network has learned the correspondence between the received signal and the control signal (also corresponding to the authentication data according to this embodiment). Following step E55, verification is positive if for example the correspondence value is close to 100%. In other words, the signal received does indeed correspond to a signal from the user. If another user tries to trace the same series of characters, the correspondence value will be small, i.e. far from 100%.

According to one variant, verification is positive when the correspondence value is higher than a determined threshold, for example 95%.

According to the particular embodiment described here, when the learning phase has been carried out according to the variant described with reference to FIG. 4B, the correspondence value provided by the neural network makes it possible to determine whether the user who has traced a series of characters is indeed the user of the terminal. In other words, in this variant, regardless of the series of characters traced by the user in order to authenticate themself, it is simply verified that the signals from tracing this series of characters do indeed correspond to the signals of characters traced by the user during the learning. It is therefore verified whether the user who requests authentication is indeed the user for whom the authentication data have been learned. According to the particular embodiment described here, when the learning phase has been carried out according to the variant described with reference to FIG. 4A, the correspondence value provided by the neural network makes it possible to determine whether the user who has traced a series of characters is indeed the user of the terminal and whether the series of characters that they have traced in order to authenticate themself is indeed the series of characters for which the authentication data have been learned. According to this variant, what is verified therefore is the identity of the user and whether they know the series of characters to be traced in order to authenticate themself.

If verification is positive, in a step E56, the authentication of the user is validated and the user may access the requested service.

Otherwise, in a step E57, the authentication of the user fails and the user may not access the service.

Figure 5B:
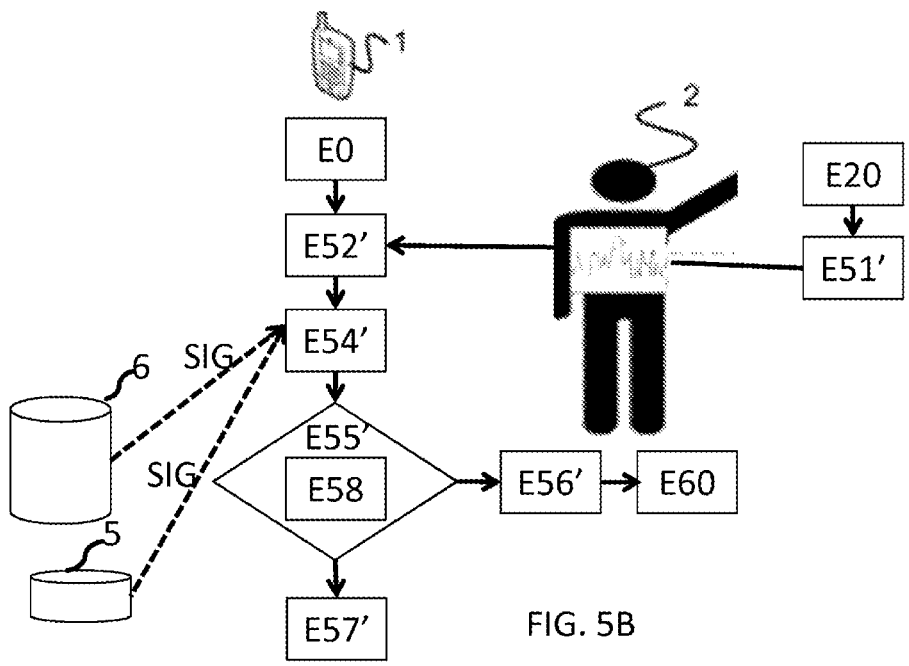
FIG. 5B shows the steps of an authentication method according to another embodiment of the invention.

FIG. 5B describes a method for authenticating a user according to another particular embodiment of the invention. According to this other particular embodiment of the invention, the control signal is distinct from the data for authenticating the user. The authentication of the user is validated if the series of characters traced by the user and after recognition of these characters on the basis of the authentication data corresponds to the control signal to be verified.

It is assumed here, as before, that all of the prerequisites necessary for CBB communication have been carried out in respective steps E0 and E20. It is also assumed that the learning phase described previously in support of FIG. 4B has been carried out and that the data for authenticating the user are located on the mobile terminal (it is recalled that such data could be located elsewhere, in a database external to the terminal for example).

In a step E51', the user traces a series of characters on a surface of the transmitting device, near the antenna.

In step E51', communication is established over the IBC channel. The transmitting device transmits a signal which is modified by the drawing of the series of characters by the user. The modified signal which is transmitted via the body of the user and carries the characteristics of the series of characters traced by the test user received by the terminal of the user (1) in a step E52'.

In a step E53', the terminal of the user demodulates and processes the received signal.

In a step E54', the terminal of the user obtains data for authenticating the user from its memory or from an external database. For example, it obtains the parameters of the neural network associated with the user.

In a step E55', it is verified whether the received signal corresponds to the control signal allowing access to the requested service. For this, in a sub-step E58, the recognition of each character traced by the user is carried out on the basis of the received signal and the obtained authentication data. For this, the received signal is delivered as input to the neural network specific to the user and a series of recognized characters is obtained as output, possibly with a correspondence value, corresponding for example to a confidence measurement associated with the series of recognized characters. In step E55', it is then determined whether the series of recognized characters corresponds to the previously stored control signal. Verification is positive for example if the series of recognized characters is identical to the control signal.

If verification is positive, in a step E56', the authentication of the user is validated and the user may access the requested service.

Otherwise, in a step E57', the authentication of the user fails and the user may not access the service.

The particular embodiments above have been described in the case that the authentication method is implemented by the terminal of the user.

In other implementations, these embodiments may be implemented by the transmitting device. The mechanisms described above are identical, the data for authenticating the user and the control signal are previously stored in the transmitting device.

When the terminal of the user receives the signal representative of the series of characters traced by the user, this signal is transmitted, for example via a Wi-Fi or Bluetooth link, to the transmitting device.

According to any of the particular embodiments described here, when the data for authenticating the user are stored in a set of user authentication data, an identifier of the user, for example a mobile number, their name, or other, is used to select the authentication data specific to the user from the set of user authentication data.

When the authentication method is implemented by the transmitting device, such an identifier is for example transmitted by the user terminal to the transmitting device via a Wi-Fi or Bluetooth channel.

As a variant of any one of the particular embodiments described above, when validating the authentication, an authentication validation signal is transmitted (E60) to a control device in order to activate the service requested by the user. Such a signal may be transmitted via a Wi-Fi or Bluetooth channel, or an IP network, etc.

The aforementioned control device may be the transmitting device, or the terminal of the user depending on the device implementing the authentication method, or else another device such as an access door, a server, etc.

Although the present disclosure has been described with reference to one or more examples, workers skilled in the art will recognize that changes may be made in form and detail without departing from the scope of the disclosure and/or the appended claims.

The invention claimed is:

1. A method for authenticating a user, implemented by a processor of a terminal of a user, comprising:
   receiving a radio signal transmitted by an antenna of a transmitting device to the terminal and received via a channel using electromagnetic wave conduction capabilities of the body of the user while the hand of the user traces at least one character on or near a surface of the transmitting device, said radio signal being representative of said at least one character traced and of said electromagnetic wave conduction capabilities of the body of said user;
   verifying whether the received signal corresponds to a previously stored control signal; and
   validating an authentication of the user in response to the signal received corresponding to the previously stored control signal.

2. The method for authenticating a user as claimed in claim 1, wherein the verifying comprises obtaining at least one previously stored item of authentication data specific to the user.

3. The method for authenticating a user as claimed in claim 2, wherein the terminal uses an identifier of the user to select at least one item of authentication data specific to the user from a set of user authentication data.

4. The method for authenticating a user as claimed in claim 2, wherein the verifying further comprises recognizing each character traced by the user on the basis of the at least one item of authentication data obtained, delivering a series of recognized characters, and determining whether the series of recognized characters corresponds to the previously stored control signal.

5. The method for authenticating a user as claimed in claim 2, wherein the verifying is implemented by a neural network having previously learned the at least one item of authentication data specific to the user.

6. The method for authenticating a user as claimed in claim 5, wherein the verifying provides a value of correspondence between the received signal and the control signal, the validating being positive when the correspondence value is higher than a determined threshold.

7. The method for authenticating a user as claimed in claim 1, wherein the validating comprises sending an authentication validation signal to a control device.

8. A terminal of a user, comprising:
   at least one memory and processor which are configured to:
   receive a radio signal transmitted by an antenna of a transmitting device to the terminal of the user, wherein the signal is received via a channel using electromagnetic wave conduction capabilities of the body of the user while the hand of the user traces at least one character on or near a surface of the transmitting device, said radio signal being representative of said at least one character traced and of said electromagnetic wave conduction capabilities of the body of said user;

verify whether the received signal corresponds to a previously stored control signal; and validate an authentication of the user in response to the signal received corresponding to the previously stored control signal.

9. The device for authenticating a user as claimed in claim 8, further comprising a transmitter for transmitting a validation signal to a control device.

10. A system for authenticating a user comprising:

a terminal of the user, comprising:

at least one memory and processor which are configured to:

receive a radio signal transmitted by an antenna of a transmitting device to the terminal of the user, wherein the signal is received via a channel using electromagnetic wave conduction capabilities of the body of the user while the hand of the user traces at least one character on or near a surface of the transmitting device, said radio signal being representative of said at least one character traced and of said electromagnetic wave conduction capabilities of the body of said user;

verify whether the received signal corresponds to a previously stored control signal; and validate an authentication of the user in response to the signal received corresponding to the previously stored control signal; and the transmitting device.

11. The system for authenticating a user as claimed in claim 10, further comprising a control device configured to receive a validation signal from the terminal.

12. A non-transitory computer-readable recording medium, comprising instructions which when executed by a processor of a terminal of a user configure the terminal to authenticate the user by:

receiving a radio signal transmitted by an antenna of a transmitting device to the terminal of the user, wherein the signal is received via a channel using electromagnetic wave conduction capabilities of the body of the user while the hand of the user traces at least one character on or near a surface of the transmitting device, said radio signal being representative of said at least one character traced and of said electromagnetic wave conduction capabilities of the body of said user;

verifying whether the received signal corresponds to a previously stored control signal; and validating an authentication of the user in response to the signal received corresponding to the previously stored control signal.

* * * * *